United States Patent
Wang et al.

(10) Patent No.: US 7,986,600 B2
(45) Date of Patent: Jul. 26, 2011

(54) OPTICAL RECORDING APPARATUS AND METHOD FOR OPTIMIZING RECORDING SIGNAL

(75) Inventors: Chun-Chieh Wang, Taipei Hsien (TW); Chung-Hsien Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 683 days.

(21) Appl. No.: 12/125,071

(22) Filed: May 22, 2008

(65) Prior Publication Data

US 2008/0298198 A1   Dec. 4, 2008

(30) Foreign Application Priority Data

Jun. 1, 2007 (CN) .......................... 2007 1 0200749

(51) Int. Cl.
*G11B 7/00* (2006.01)

(52) U.S. Cl. ................. 369/59.11; 369/59.12; 369/53.26

(58) Field of Classification Search ............... 369/59.11, 369/59.12, 53.26, 53.27
See application file for complete search history.

(56) References Cited

U.S. PATENT DOCUMENTS

| | | | |
|---|---|---|---|
| 6,339,579 B1 | 1/2002 | Kamioka et al. | |
| 7,196,996 B2 | 3/2007 | Matsuda | |
| 7,215,617 B2 | 5/2007 | Ando et al. | |
| 2005/0243670 A1 | 11/2005 | Kakimoto et al. | |
| 2006/0187788 A1* | 8/2006 | Kakimoto et al. | 369/59.11 |
| 2006/0256690 A1* | 11/2006 | Sekiguchi et al. | 369/59.12 |

FOREIGN PATENT DOCUMENTS

CN   1308928 C   9/2005

* cited by examiner

*Primary Examiner* — Adam R Giesy
(74) *Attorney, Agent, or Firm* — Frank R. Niranjan (57) ABSTRACT

An exemplary method for optimizing a recording signal of an optical recording apparatus to record data onto a disc, the recording signal having a first pulse-width parameter, the method includes selecting an initial value of the first pulse-width parameter; generating adjusted values based on the initial value to record test data onto the disc respectively; measuring mark lengths of lands; determining average lengths of the mark lengths of lands; determining differences between the average lengths and a predetermined standard length; linear curve fitting the adjusted values and the differences employing the following linear curve fitting equation: $Y=AX+B$ to obtain the constants A and B, wherein X represents the adjusted values, Y represents the differences; determining and storing an optimum value of the first pulse-width parameter to be used for recording the data onto the disc, this optimum value equals to $-B/A$. An optical recording apparatus is also provided.

18 Claims, 9 Drawing Sheets

| Parameters \ Recording Speed | 2x |
|---|---|
| TOPR3P | -0.05T |
| TOPR4P~14P | 0T |
| TLAST3P~14P | 0T |

OPTICAL RECORDING APPARATUS AND METHOD FOR OPTIMIZING RECORDING SIGNAL

BACKGROUND

1. Field of the Invention

The present invention relates to optical recording apparatuses and methods, and particularly to an optical recording apparatus and method for optimizing recording signals.

2. Description of Related Art

Optical recording apparatuses for recording data onto recordable optical discs are widely used. Recordable optical discs, including write once discs (such as CD-Rs, DVD-Rs) and rewriteable discs (such as DVD-RWs, DVD-RAMs), are popular optical storage media in the consumer electronics market.

A typical optical recording apparatus (recording apparatus in short) uses a laser beam to record the data onto the optical disc. The laser beam is controlled by a recording signal of the recording apparatus. The recording signal is non-multi pulse for the write once discs, and multi-pulse for rewriteable discs. The pulse-width parameters of the recording signal determine the length of the pits and the lands. If the pulse-width parameters of the recording signal are inappropriate, the data recorded on the disc by the laser beam may not be readable.

Generally, the recording signal of the recording apparatus to record the data onto the disc is predetermined by a disc manufacturer or the recording apparatus manufacturer. For example, a recording apparatus identifies a disc loaded in the recording apparatus by reading a media ID (MID) embedded in the disc; thus optimized parameters for determining the recording signal stored in the recording apparatus is selected according to the MID.

However, the optimized recording parameters for the recording signal may not be appropriate to record different discs; even if the discs have a same MID. For example, a first batch of the discs may have data written on them soon after being manufactured, while a second batch of the discs may have data written on them after an extended time period and may have being subjected to different environmental conditions. The recording properties of these two batches of discs may change due to such conditions as temperature and humidity.

Therefore, an improved optical recording apparatus and method for optimizing the recording signal of the optical recording apparatus are needed to address the aforementioned deficiency and inadequacies.

SUMMARY

An exemplary method for optimizing a recording signal of an optical recording apparatus to record data onto a disc, the recording signal having a first pulse-width parameter, the method includes selecting an initial value of the first pulse-width parameter; generating adjusted values based on the initial value to record test data onto the disc respectively; measuring mark lengths of lands; determining average lengths of the mark lengths of lands; determining differences between the average lengths and a predetermined standard length; linear curve fitting the adjusted values and the differences employing the following linear curve fitting equation: $Y=AX+B$ to obtain the constants A and B, wherein X represents the adjusted values, Y represents the differences; determining and storing an optimum value of the first pulse-width parameter to be used for recording the data onto the disc, this optimum value equals to $-B/A$. A related optical recording apparatus is also provided.

Other advantages and novel features of the present invention will become more apparent from the following detailed description of exemplary embodiment when taken in conjunction with the accompanying drawings.

DETAILED DESCRIPTION OF THE EMBODIMENTS

Reference will now be made to the drawings to describe an exemplary embodiment of the present optical recording apparatus and method for optimizing a recording signal of the optical recording apparatus.

Figure 1:
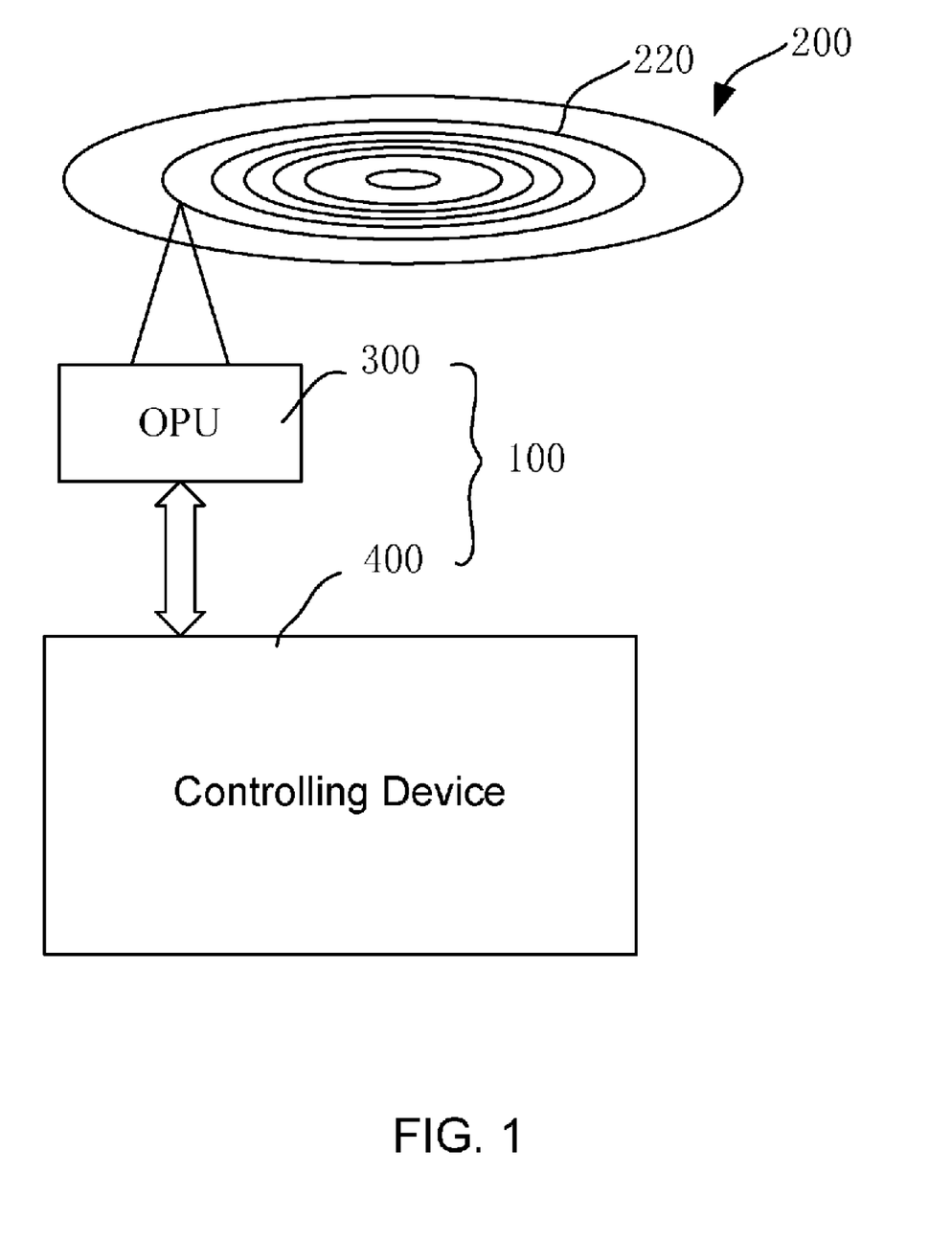
FIG. 1 is a block diagram of an optical recording apparatus in accordance with an exemplary embodiment, the recording apparatus including a controlling device.

Referring to FIG. 1, an optical recording apparatus 100 used for recording data onto a disc 200 is depicted. Generally, the disc 200 includes concentric tracks 220 having increasing radii from a center to a periphery of the disc 200. The recording apparatus 100 includes an optical pickup unit (OPU) 300 for emitting a laser beam on the disc 200, and a controlling device 400 for adjusting pulse-width parameters of the recording signal, in other words, adjusting the time the laser beam emitted.

Figure 2:
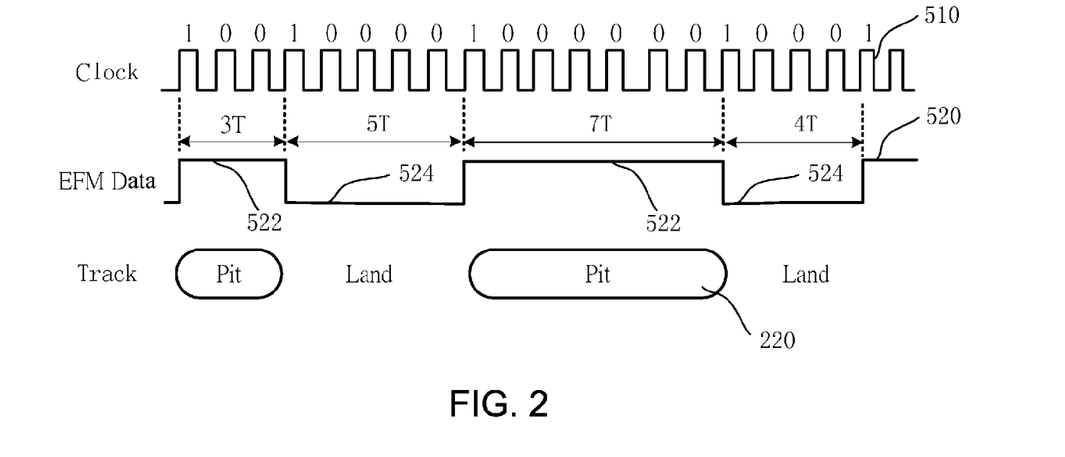
FIG. 2 is a waveform chart showing a clock signal, an EFM data signal, and a track.

FIG. 2 shows relationships among a clock signal 510, an EFM data signal 520, and a track 220. The track 220 includes pits and lands. The pits are shallow depressions on the disc 200, usually as deep as ¼ of the laser beam's wavelength. The pits are designed to cause cancellation of the laser beam, that is, the pits are not reflective. The lands between the pits are reflective, meaning that the laser beam is reflected, off of the surface of the land, to the OPU 300. A transition either from a pit to a land or from the land to the pit represents a logical '1', while the absence of the transition represents a logical '0'. The data signal 520 includes an nT width mark period 522 (n=3~11, 14) and an nT width space period 524 (n=3~11, 14), wherein "T" represents a time period for recording one binary bit on the disc 200 and "n" represents the number of Ts. The mark period 522 is configured for generating the pits on the track 220 and the space period 524 is configured for generating the lands on the track 220.

Generally, a CD compatible medium employs an EFM (Eight to Fourteen Modulation) scheme. With the EFM, every 8 bits of data are converted into 14-bits codes. In the 14-bits codes, '0' is used to denote the land or the pit, and '1' is used to signal the transition from the land to the pit or the pit to the land. There are always at least three and no more than eleven '0's between every adjacent transition. Within an EFM lookup table, it is possible for the 14-bits codes to start or end with a '1'. In order to avoid a first group of 14-bits code ending with a "1" and a following group of 14 bits code beginning with a '1', three merging bits of three '0's are added between all the adjacent 14-bits codes. Thus, EFM can be considered as an eight-to-seventeen modulation scheme. Thus, a longest pit length or a longest land length is 14 T. EFMPlus is an equivalent encoding method employed by DVD formats. EFMPlus works in a same way for DVD as EFM works for CD, except that the 8-bit source codes are converted to 16-bit codes. An EFMPlus lookup table is constructed in such a way that merging bits are not required between the start and end bits of adjacent codes.

Figure 3:
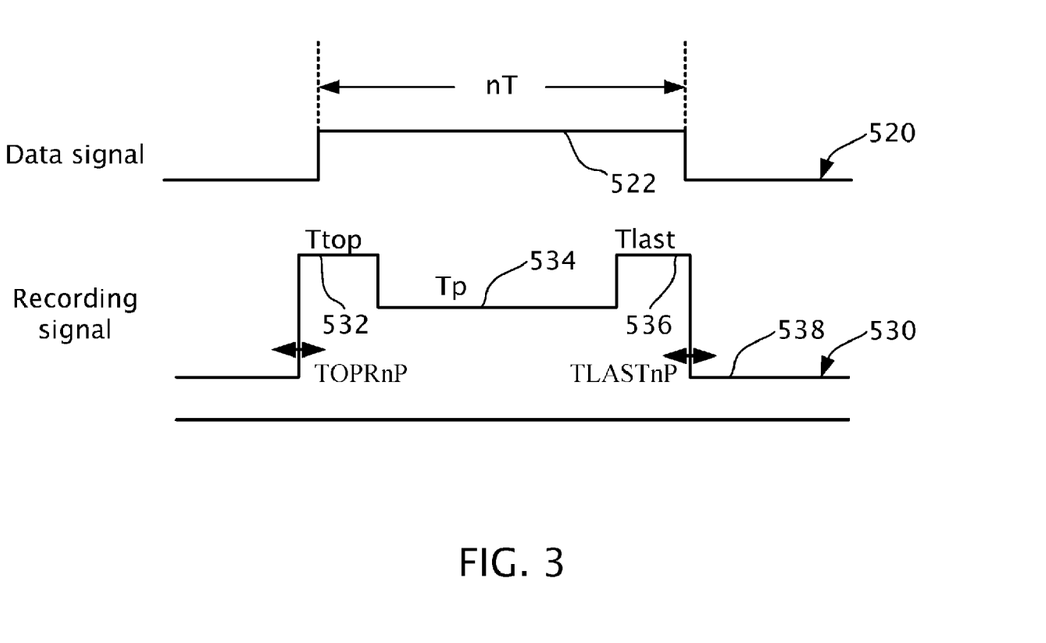
FIG. 3 is a waveform chart showing the data signal and a recording signal.

FIG. 3 shows a relation between the data signal 520 and a recording signal 530 for recording an nT length pit. The recording signal 530 includes a top pulse (Ttop in short) 532, a middle pulse (Tp) 534, a last pulse (Tlast) 536, and a low level portion 538. A TOPRnP and a TLASTnP are two pulse-width parameters for adjusting the recording signal 530. The parameter TOPRnP is used for adjusting the position of a rising edge of the Ttop. The parameter TLASTnP is used for adjusting the position of a falling edge of the Tlast. The pulse-width parameters of the recording signal 530 further include an actual width of the recording signal 530, a width of the Ttop 532, and a width of the Tlast 536. In the exemplary embodiment, parameters TOPRnP and TLASTnP are adjusted.

Figure 4:
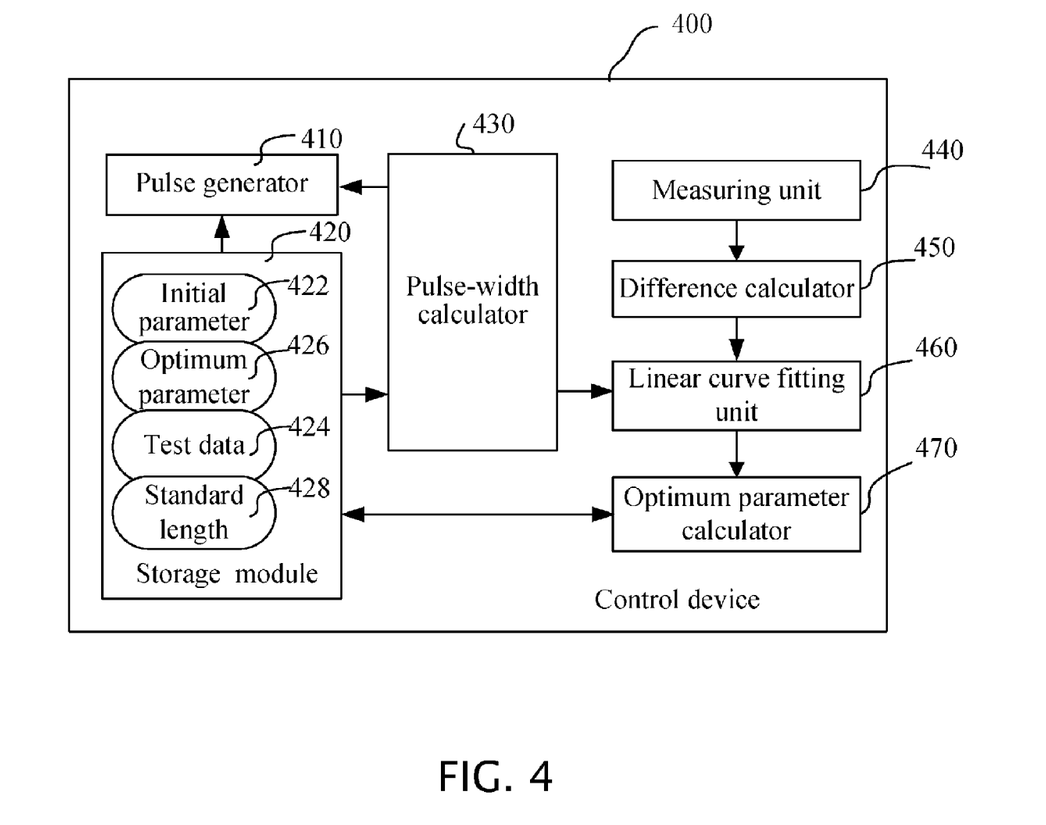
FIG. 4 is a detailed block diagram of the controlling device of FIG. 1.

Referring to FIG. 4, the controlling device 400 includes a pulse generator 410, a storage module 420, a pulse-width calculator 430, a measuring unit 440, a difference calculator 450, a linear curve fitting unit 460, and an optimum parameter calculator 470. The storage module 420 includes an initial parameter unit 422, a test data unit 424, an optimum parameter unit 426, and a standard length unit 428.

Figure 5:
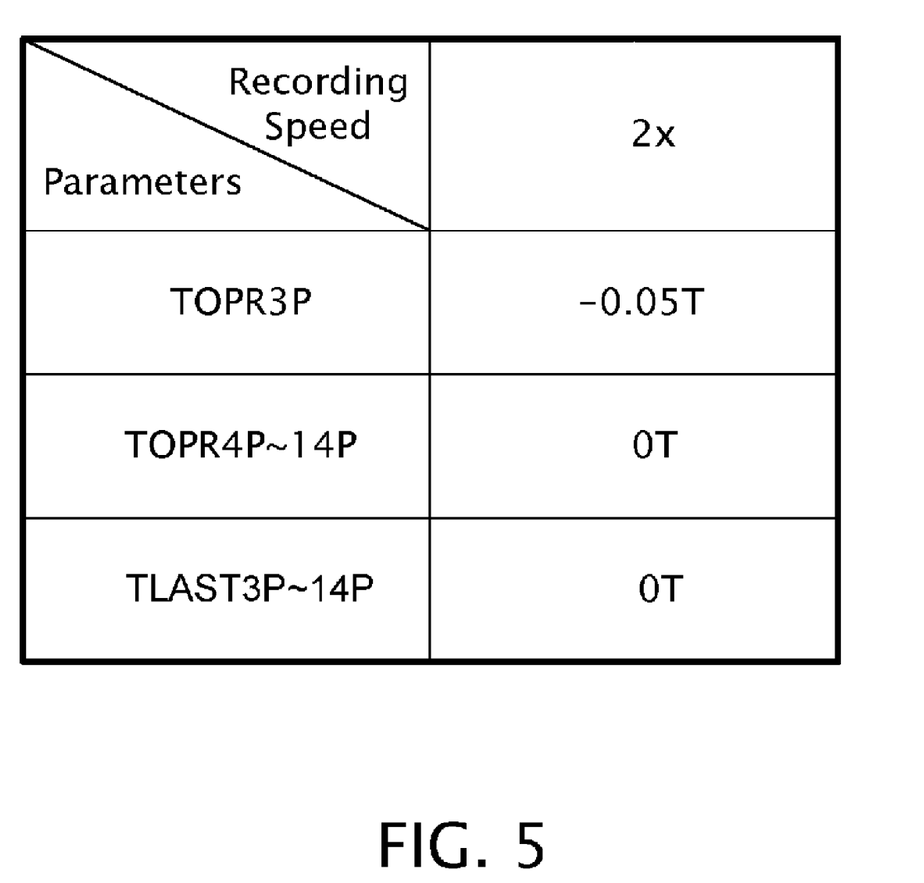
FIG. 5 is a table illustrating initial values of the TOPRnP and TLASTnP are listed at a double recording speed.

The initial parameter unit 422 is used for storing initial values of the pulse-width parameters, such as the initial values of the parameters TOPRnP and TLASTnP. Referring also to FIG. 5, the initial values of the TOPR3P to TOPR14P, and TLAST3P to TLAST14P are listed correspondingly to a double recording speed (2×). A recording speed is used for denoting an amount of data recorded onto the disc 200 per second, and is usually measured in mega bytes per second (MB/s). For example, a single DVD recording speed (1×) is 1.32 MB/s. The initial values of the pulse-width parameters are derived by performing initial testing.

The pulse generator 410 is used for generating the recording signal 530 based on pulse-width parameters stored in the storage module 420.

Figure 6:
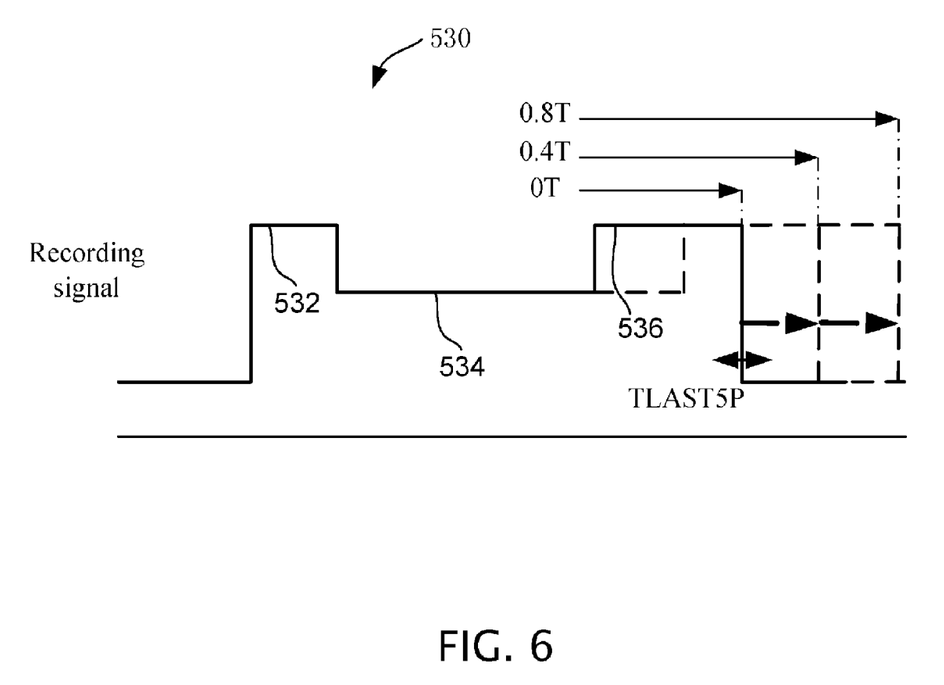
FIG. 6 is a schematic diagram illustrating adjusted values of the parameter TLAST5P of the recording signal.

The pulse-width calculator 430 is used for calculating adjusted values of the parameters TOPRnP and TLASTnP. In the exemplary embodiment, the adjusted values are obtained by adding/subtracting a constant value (0.4 T for example) to/from the initial value correspondingly. Referring also to FIG. 6, several adjusted values of the parameter TLAST5P of the recording signal 530 are calculated by the pulse-width calculator 430 based on the initial value of the parameter TLAST5P stored in the initial parameter unit 422. For example, when the disc 200 is to be recorded at 2× recording speed, the initial value of parameter TLAST5P corresponding to the 2× recording speed would be 0 T according to FIG. 5. The adjusted values of the parameter TLAS5P calculated by the pulse-width calculator 430 may be, for example, 0.4 T, and 0.8 T.

The test data unit 424 is constructed and arranged for storing test data. The recording apparatus 100 records the test data onto the disc 200 employing the recording signal 530 with several adjusted values correspondingly. Thus, there are several groups of test data recorded on the disc 200.

The measuring unit 440 is configured for measuring mark length of pits and mark length of lands after the several groups of test data are recorded on the disc 200. In the exemplary embodiment, only mark lengths of lands within a predetermined range are measured. For example, mark lengths of lands within 0.5 T to 3.5 T are measured, or 3.5 T to 4.5 T are measured.

The standard length unit 428 is configured for storing standard lengths of nT, such as 3 T, 4 T, or 5 T. In operation, when mark lengths of lands within 0.5 T to 3.5 T are measured, standard length of 3 T is stored in the standard length unit 428, when mark lengths of lands within 3.5 T to 4.5 T, standard length of 4 T is stored in the standard length unit 428, the rest may be deduced by analogy.

The difference calculator 450 is configured for calculating several average lengths of the mark lengths of the lands corresponding to the several adjusted values, wherein the mark lengths are within the predetermined range, and finally calculating several differences between the average lengths and the standard length of nT. Therefore, several differences are obtained respectively corresponding to the several adjusted values.

Figure 7:
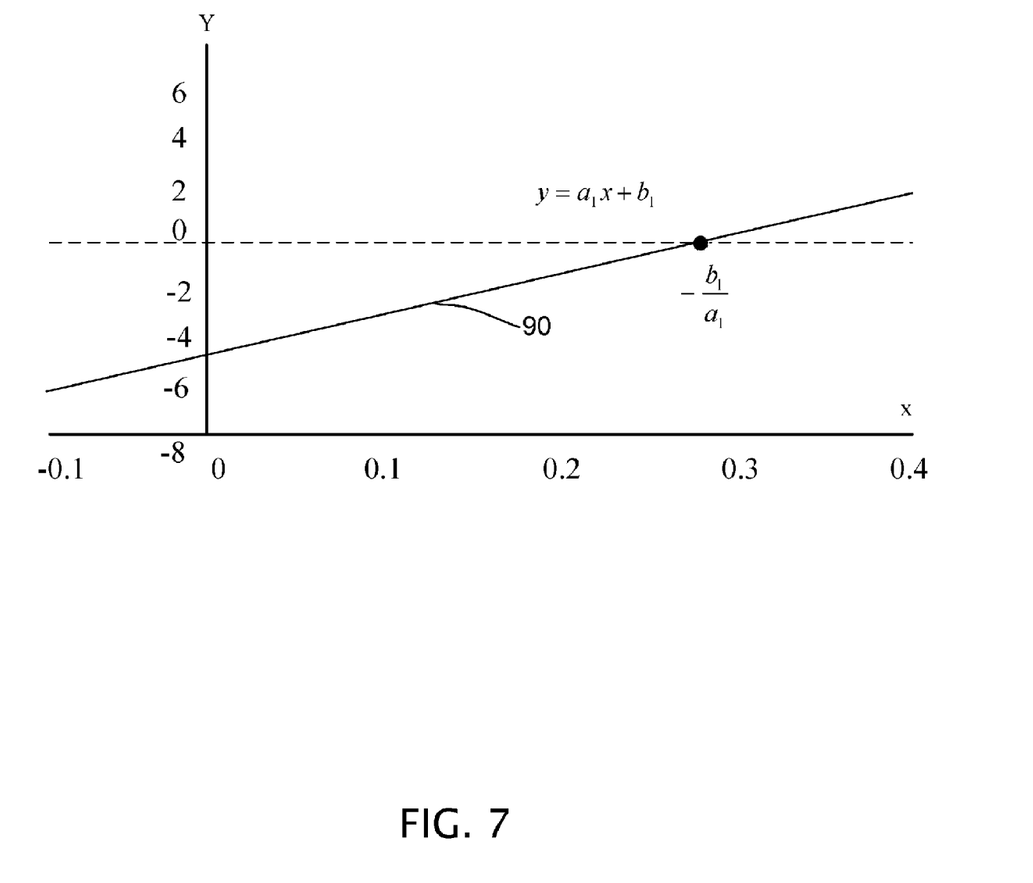
FIG. 7 is a graph illustrating a linear graph fitted to the adjusted values and several differences.

The linear curve fitting unit 460 is configured for linear curve fitting the several adjusted values and the several differences. Referring to FIG. 7, a linear graph 90 is fitted to these data points. The X-axis represents the adjusted values of the parameter TOPRnP or TLASTnP, and the Y-axis represents the several differences. The linear graph 90 is defined by the following linear curve fitting equation:

$$y = a_1 x + b_1.$$

Constants $a_1$ and $b_1$ can be calculated according to the linear graph 90.

The optimum parameter calculator 470 is configured for calculating an optimum value of the parameter TOPRnP or TLASTnP. The optimum value equals to $-b_1/a_1$, and is stored in the optimum parameter unit 426.

Figure 8:
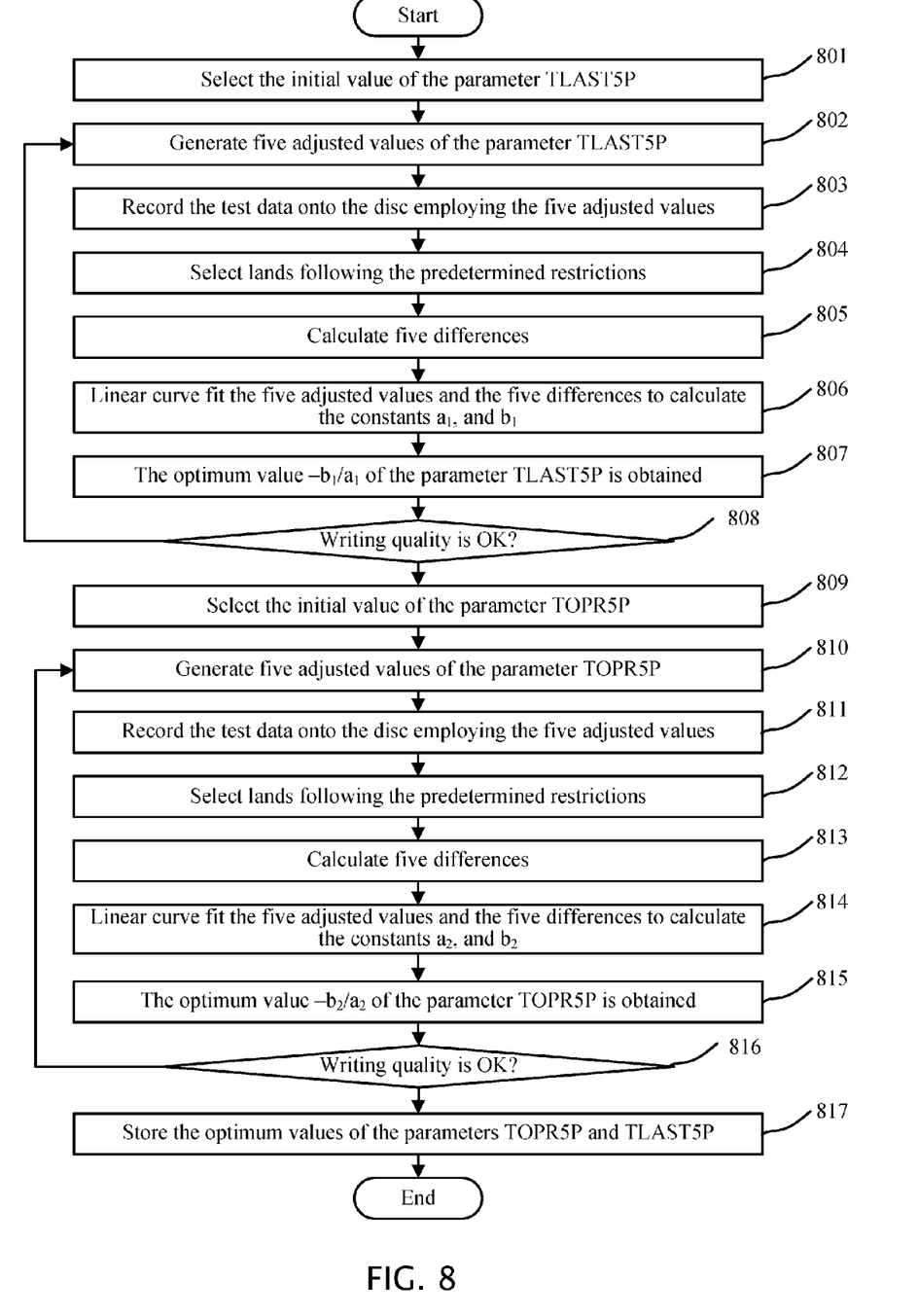
FIG. 8 is the procedure of a method for determining the recording signal of the recording apparatus of FIG. 1.

Referring to FIG. 8, a procedure of a method for determining the recording signal of the recording apparatus 100 is illustrated. For exemplary purposes, in the exemplary embodiment, the recording signal 530 for recording a 5 T pit is adjusted, that is, the parameters TLAST5P and TOPR5P are adjusted. Methods for adjusting the other recording signals for recording a 3 T, 4 T, and 6 T to 14 T pits are similar.

In step 801, the recording apparatus 100 selects the initial value of the parameter TLAST5P stored in the initial parameter unit 422. Referring also to FIG. 5, the initial value of the parameter TLAST5P is 0 T.

In step 802, the recording apparatus 100 generates five adjusted values of the parameter TLAST5P by adding/subtracting a stochastic constant (0.1 T for example) to/from the initial value (0 T). The adjusted values could be −0.1 T, 0.1 T, 0.2 T, 0.3 T, and 0.4 T.

In step 803, the recording apparatus 100 records the test data onto the disc 200 employing the five adjusted values correspondingly. Therefore, five groups of test data are recorded on the disc 200.

In step 804, the recording apparatus 100 detects the five groups of test data recorded on the disc 200 one by one to pick out lands (denoted by $Q_1$) with lengths (denoted by $L_1$) larger than or equal to 0.5 T, and lower than or equal to 3.5 T (0.5 T ≦ $L_1$ ≦ 3.5 T). The lands $Q_1$ should further follow the following restrictions: $0.5\,T \leq T_{j,P} \leq 3.5\,T$, and $(n-0.5)\,T \leq T_{k,P} \leq (n+0.5)\,T$, wherein $T_{j,P}$ represents a length of a pit immediately following any of the lands $Q_1$, $T_{k,P}$ represents a length of a pit immediately preceding any of the lands $Q_1$. As n=5, $4.5\,T \leq T_{k,P} \leq 5.5\,T$. Lengths $L_1$ of the selected lands $Q_1$ are then sent to the difference calculator 450.

In step 805, the difference calculator 450 calculates five average lengths of the lands $Q_1$ corresponding to the five group of test data, and finally calculates five differences between the average lengths and the standard length of 3 T. Therefore, five differences are obtained corresponding to the five adjusted values of the parameter TLAST5P.

In step 806, the recording apparatus 100 linear curve fits the five adjusted values and the five differences to calculate the constants $a_1$, and $b_1$.

In step 807, the optimum value $-b_1/a_1$ of the parameter TLAST5P is obtained.

In step 808, the recording apparatus 100 records the test data onto the disc 200 employing the optimum value $-b_1/a_1$ of the parameter TLAST5P, and then detects whether the pits and lands are eligible, if not, the adjusting procedure proceeds to step 802, or else, the adjusting procedure proceeds to step 809.

In step 809, the recording apparatus 100 selects the initial value of the parameter TOPR5P stored in the initial parameter unit 422. The initial value of the parameter TOPR5P is 0 T.

Figure 9:
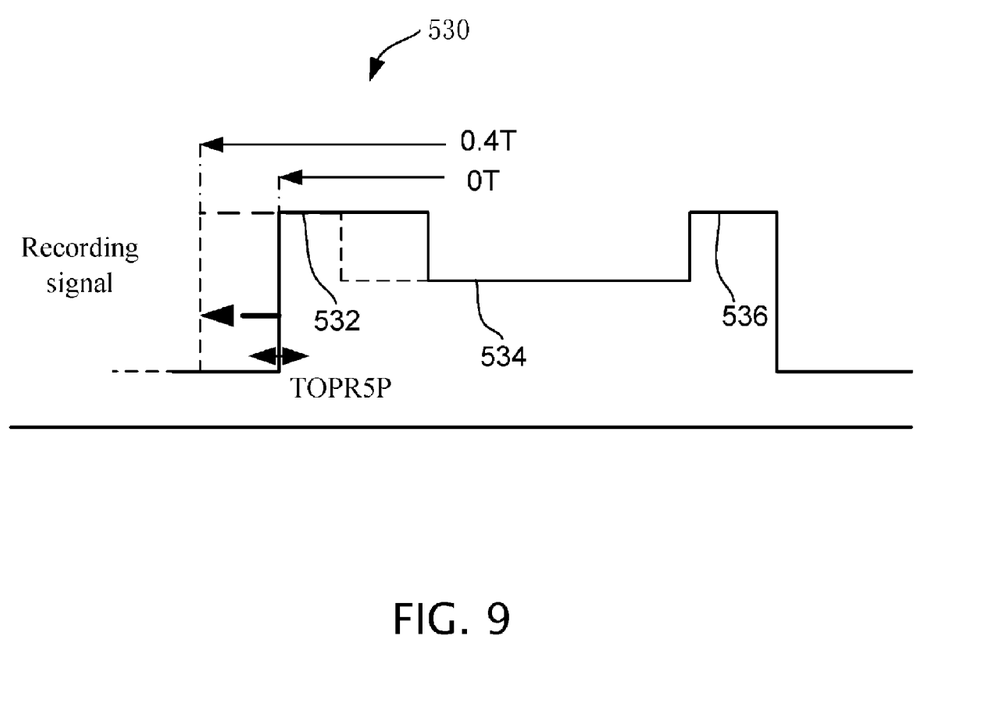
FIG. 9 is a schematic diagram illustrating adjusted values of the parameter TOPR5P of the recording signal.

In step 810, the recording apparatus 100 generates five (or more) adjusted values of the parameter TOPR5P by adding/subtracting a stochastic constant to/from the initial value. Referring also to FIG. 9, the initial and an adjusted value of the parameter TOPR5P of the recording signal 530 are shown.

In step 811, the recording apparatus 100 records five groups of test data onto the disc 200 employing the five adjusted values respectively.

In step 812, the recording apparatus 100 detects the five groups of test data recorded on the disc 200 one by one to pick out the lands (denoted by $Q_2$) with lengths (denoted by $L_2$) larger than or equal to 0.5 T, and lower than or equal to 3.5 T ($0.5\,T \leq L_2 \leq 3.5\,T$). The lands $Q_2$ should further follow the following restrictions: $0.5\,T \leq T_{J,P} \leq 3.5\,T$, $4.5\,T \leq T_{K,P} \leq 5.5\,T$, wherein $T_{J,P}$ represents a length of a pit immediately preceding any of the lands $Q_2$, $T_{K,P}$ represents a length of a pit immediately following any of the lands $Q_2$. Lengths $L_2$ of the selected lands $Q_2$ are then sent to the difference calculator 450.

In step 813, the difference calculator 450 calculates five differences corresponding to the five adjusted values of the parameter TOPR5P.

In step 814, the recording apparatus 100 linear curve fits the five adjusted values and the five differences to obtain a linear graph (not shown) defined by the following linear curve fitting equation:

$$y = a_2 x + b_2,$$

Wherein the X-axis represents the adjusted values of the parameter TOPRnP, and the Y-axis represents the differences. Constants $a_2$ and $b_2$ can be calculated according to the linear graph.

In step 815, the optimum value $-b_2/a_2$ of the parameter TOPR5P is obtained.

In step 816, the recording apparatus 100 records the test data onto the disc 200 employing the optimum value $-b_2/a_2$ of the parameter TOPR5P, and then detects whether the pits and lands are eligible, if not, the adjusting procedure proceeds to step 810, or else, the adjusting procedure proceeds to step 809.

In step 817, the recording apparatus 100 stores the two optimum values of the parameters TOPR5P and TLAST5P in the optimum parameter unit 426.

The optimum values $-b_1/a_1$, $-b_2/a_2$ of the parameters TOPRnP and TLASTnP are calculated based on the test data recorded onto the disc 200. Therefore, the recording signal is determined according to different discs and qualities of recording the discs are improved.

In other embodiments, the optimum value of the parameter TOPRnP can be adjusted firstly, and the optimum value of the parameter TLASTnP is adjusted secondly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for optimizing a recording signal of an optical recording apparatus to record data onto a disc, the recording signal having a first pulse-width parameter, the method comprising:
   selecting an initial value of the first pulse-width parameter stored in the optical recording apparatus;
   generating a plurality of adjusted values based on the initial value to record test data onto the disc respectively;
   measuring mark lengths of lands after the test data are recorded on the disc;
   determining average lengths of the mark lengths of lands corresponding to the plurality of adjusted values;
   determining differences between the average lengths and a predetermined standard length;
   linear curve fitting the adjusted values and the differences employing the following linear curve fitting equation: Y=AX+B to obtain the constants A and B, wherein X represents the adjusted values, Y represents the differences;
   determining an optimum value of the first pulse-width parameter, this optimum value equals to $-B/A$; and
   storing the optimum value to be used for recording the data onto the disc.

2. The method for optimizing a recording signal as described in claim 1, wherein the adjusted values are generated linearly based on the initial value of the first pulse-width parameter.

3. The method for optimizing a recording signal as described in claim 1, wherein the recording signal, for recording pits with nT length, comprising a top pulse, a last pulse, and a middle pulse between the top pulse and the last pulse, the first pulse-width parameter is configured for adjusting the position of a rising edge of the top pulse, T represents a time period for recording one binary bit on the disc, and n represents the number of Ts.

4. The method for optimizing a recording signal as described in claim 3, wherein when measuring the mark lengths of lands, only the lands according to the following restrictions are measured: lengths of the lands are larger than or equal to 0.5 T, and shorter than or equal to 3.5 T; lengths of pits immediately preceding the lands are larger than or equal to 0.5 T, and shorter than or equal to 3.5 T; and lengths of pits immediately following the lands are larger than or equal to $(n-0.5\,T)$, and shorter than or equal to $(n+0.5\,T)$.

5. The method for optimizing a recording signal as described in claim 4, wherein the predetermined standard length is the standard length of 3 T.

6. The method for optimizing a recording signal as described in claim 1, wherein the recording signal, for recording pits whose length is nT comprising a top pulse, a last pulse, and a middle pulse between the top pulse and the last pulse, the first pulse-width parameter is configured for adjusting the position of the falling edge of the last pulse, T represents a time period for recording one binary bit on the disc, and n represents the number of Ts.

7. The method for optimizing a recording signal as described in claim 6, wherein when measuring the mark lengths of lands, only the lands according to the following restrictions are measured: lengths of the lands are larger than or equal to 0.5 T, and shorter than or equal to 3.5 T; lengths of pits immediately following the lands are larger than or equal to 0.5 T, and shorter than or equal to 3.5 T; and lengths of pits immediately preceding the lands are larger than or equal to (n−0.5 T), and shorter than or equal to (n+0.5 T).

8. The method for optimizing a recording signal as described in claim 7, wherein the predetermined standard length is the standard length of 3 T.

9. The method for optimizing a recording signal as described in claim 7, further comprising:
   recording the test data onto the disc employing the optimum value of the first pulse-width parameter;
   checking the recorded pits and lands;
   if the lengths of the pits and lands are eligible, storing the optimum value.

10. An optical recording apparatus, comprising:
   an optical pickup unit for emitting a laser beam to be focused on a disc to record data onto the disc; and
   a controlling device for adjusting a recording signal for controlling the laser beam, the controlling device comprising:
   a pulse generator for generating the recording signal;
   a storage module for storing an initial value of the first pulse-width parameter and test data;
   a pulse-width calculator for calculating a plurality of adjusted values of the first pulse-width parameter;
   a measuring unit for measuring mark lengths of lands after the test data are recorded;
   a difference calculator for calculating average lengths of the mark lengths of lands corresponding to the plurality of adjusted values, the difference calculator further calculating differences between the average lengths and a predetermined standard length;
   a linear curve fitting unit for linear curve fitting the adjusted values and the differences employing the following linear curve fitting equation: Y=AX+B to obtain the constants A and B, wherein X represents the adjusted values, Y represents the differences; and
   wherein an optimum value of the first pulse-width parameter equals to −B/A.

11. The optical recording apparatus as claimed in claim 10, wherein the storage module comprises an optimum parameter unit for storing the optimum value of the first pulse-width parameter.

12. The optical recording apparatus as claimed in claim 10, wherein the adjusted values are generated linearly based on the initial value of the first pulse-width parameter.

13. The optical recording apparatus as described in claim 10, wherein the recording signal, for recording pits with nT length, comprising a top pulse, a last pulse, and a middle pulse between the top pulse and the last pulse, the first pulse-width parameter is configured for adjusting the position of the rising edge of the top pulse, T represents a time period for recording one binary bit on the disc, and n represents the number of Ts.

14. The optical recording apparatus as described in claim 13, wherein only the lands following the following restrictions are measured by the measuring unit: lengths of the lands are larger than or equal to 0.5 T, and shorter than or equal to 3.5 T; lengths of pits immediately preceding the lands are larger than or equal to 0.5 T, and shorter than or equal to 3.5 T; and lengths of pits immediately following the lands are larger than or equal to (n−0.5 T), and shorter than or equal to (n+0.5 T).

15. The optical recording apparatus as described in claim 14, wherein the predetermined standard length is the standard length of 3 T.

16. The optical recording apparatus as described in claim 10, wherein the recording signal, for recording pits with nT length comprising a top pulse, a last pulse, and a middle pulse between the top pulse and the last pulse, the first pulse-width parameter is configured for adjusting the position of the falling edge of the last pulse, T represents a time period for recording one binary bit on the disc, and n represents the number of Ts.

17. The optical recording apparatus as described in claim 16, wherein only the lands following the following restrictions are measured by the measuring unit: lengths of the lands are larger than or equal to 0.5 T, and shorter than or equal to 3.5 T; lengths of pits immediately following the lands are larger than or equal to 0.5 T, and shorter than or equal to 3.5 T; and lengths of pits immediately preceding the lands are larger than or equal to (n−0.5 T), and shorter than or equal to (n+0.5 T).

18. The optical recording apparatus as described in claim 17, wherein the predetermined standard length is the standard length of 3 T.

* * * * *